Dec. 7, 1943.  J. W. FRENCH  2,336,239
OPTICAL SIGHTING APPARATUS
Filed June 9, 1941
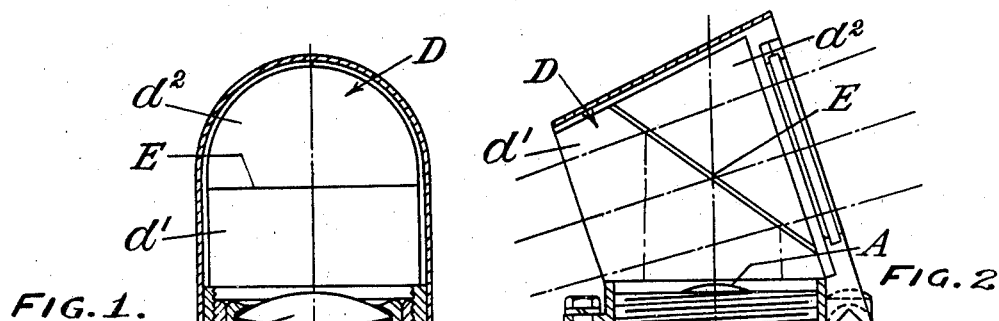
FIG. 1.  FIG. 2.
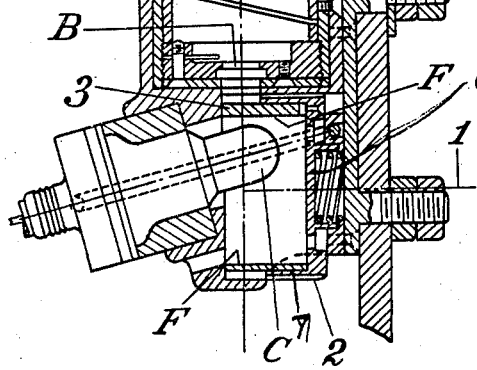
FIG. 3.  FIG. 4.
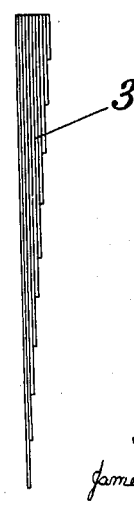
FIG. 5.
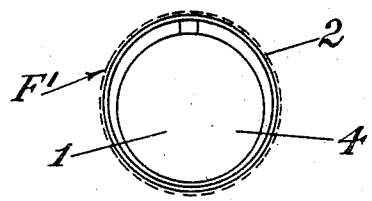
Inventor
James Weir French
per
Lancaster, Allwine and Rommel
Attorneys Patented Dec. 7, 1943

2,336,239

UNITED STATES PATENT OFFICE 2,336,239

OPTICAL SIGHTING APPARATUS

James Weir French, Anniesland, Glasgow, Scotland, assignor to Barr and Stroud, Limited, Anniesland, Glasgow, Scotland Application June 9, 1941, Serial No. 397,340
In Great Britain August 28, 1939

4 Claims. (Cl. 88—2.3)

This invention relates to optical sighting apparatus and more particularly to a gun sight of the kind disclosed in my copending application for U. S. patent, filed June 9, 1941, Serial No. 397,399, embodying an illuminating lamp, and in particular to sighting apparatus of what may be termed the transparent reflecting screen type, i. e. the type in which the object under observation (hereinafter referred to as the target) is viewed by the observer through a transparent screen which serves as a reflector for presenting to the observer an image of a reference mark, formed by light from the lamp, in the line of sight to the target.

In illuminated sights, it may be desirable to vary the brightness of the lamp, and the method previously adopted for doing this is to use a variable resistance in the circuit of the lamp.

According to the present invention, variation of brightness of illumination in a sight is effected by movement, in the path of the light, of a dimming screen having different degrees of translucency at different parts.

The screen may be such as to give by its movement continuous variation of brightness of illumination between limits, or it may give step-by-step variation.

In carrying the invention into practice, the dimming screen is preferably mounted for rotational movement, to bring the parts of different degrees of translucency into the path of the light utilised for sighting purposes.

In one construction, the dimming screen is of ring form surrounding the lamp, with part of the screen located in the path of the light, the screen varying in translucency round its periphery and being rotatable around the lamp. For this purpose, the radial thickness of the wall of the ring may vary, to give varying degrees of translucency as the ring is turned.

To provide for maximum brightness of illumination, the ring may have a gap formed in it to allow of the direct passage of light.

The invention will now be described with reference to the accompanying drawing, in which:

Figure 1 is a sectional elevation showing the application of the invention to a sight of the transparent reflecting screen type, Figure 2 is an elevation, partly in section, at right angles to Figure 1, Figures 3 and 4 are views illustrating the construction of a first example of dimming ring, and Figure 5 illustrates a second example.

The sighting apparatus to which the invention is applied as shown in Figure 1, comprises a collimator lens arrangement A, a graticule B, a lamp C, and a transparent reflecting screen arrangement D. The screen arrangement comprises two prisms $d^1$ and $d^2$ secured together with a sealed air space E of minute thickness between them set obliquely to the observer's line of sight to the target, to constitute a transparent reflecting screen. Light from the lamp C is projected on to the screen E and by reflection thereat forms an image of the graticule B in the observer's line of sight to the target, which image the observer views simultaneously with the target.

A dimming ring F of cylindrical form extends around the lamp C, being composed of translucent material with its wall of varying radial thickness and thus of varying translucency. The ring F is mounted for rotation about its axis I, for which purpose it is provided with an annular head 2 for finger operation. The head 2 comprises a rotatable disc-like body 6 and an annular flange 7 extending outwardly from one face of the body, coaxial with the axis of rotation of the body, the flange 7 having a width equal to substantially one half the width of the ring F.

Referring now to Figures 3 and 4, the ring F is made up of a series of laminations 3 of a Celluloid material, the first lamination being long enough to extend over almost the full peripheral length of the ring when bent into a circle, and successive laminations being progressively shorter to give a step-by-step effect. At one end the laminations are flush, and the laminations are held together, for instance, by small rivets or by cementing. The laminations are then bent and sprung into the annular head 2 from which they project axially so that substantially one half of the width of the ring is exposed beyond the free margin of the flange 7, as shown in Figure 1, the finished fitting being as shown in Figure 3 with a gap in the ring at 5. By this construction, if that portion of the ring F thru which the rays of light pass to the graticule B becomes darkened or damaged, the ring may be removed and turned end-for-end and replaced in the head 2, so as to expose the other half of the ring in the plane of the path of light rays between the lamp C and the graticule B.

The Celluloid material used is generally coloured, being for example, a pale orange colour, with the result that the ring progresses from a pale orange to a denser orange, finishing with a part of extreme density, where some other colouration may be introduced to give the necessary density.

A compound strip such as shown in Figure 4 could, in its unbent condition, be used as a dimming strip with a lengthwise movement.

Figure 5 shows an alternative in which the ring F¹ is formed from a cylindrical block of translucent material by drilling an eccentric bore 4 in it, and then fitting it into the annular head 2.

I claim:

1. A gun sighting apparatus comprising an illuminating lamp a graticule in the path of light therefrom, and a screen of ring form surrounding the lamp with part of the screen located in the path of the light between said lamp and graticule, the screen varying in translucency round its periphery and being mounted in the sighting apparatus for rotation around the lamp, to vary the brightness of illumination of the graticule, the screen being built up of a series of laminations of translucent material, the first lamination being long enough to extend over all or almost all of the peripheral length of the ring when bent into a circle, and successive laminations being progressively shorter, the laminations being laid the one on the other and bent into and secured in a circular form to constitute the screen.

2. A gun sighting apparatus comprising an illuminating lamp a graticule in the path of light therefrom, and a screen of ring form surrounding the lamp with part of the screen located in the path of the light between said lamp and graticule, the screen varying in translucency round its periphery and being mounted in the sighting apparatus for rotation around the lamp to vary the brightness of illumination of the graticule, the screen being built up of a series of laminations of translucent material, the first lamination being long enough to extend over all or almost all of the peripheral length of the ring when bent into a circle and successive laminations being progressively shorter, the laminations being laid the one on the other and bent and inserted into an annular head from which they project axially as a translucent ring.

3. A gun sighting apparatus comprising an illuminating lamp a graticule in the path of light therefrom, and a screen of ring form surrounding the lamp with part of the screen located in the path of the light between said lamp and graticule, the screen varying in translucency around its periphery and being mounted in the sighting apparatus for rotation around the lamp to vary the brightness of illumination of the graticule, the screen being built up of a series of laminations of translucent material, the first lamination being long enough to extend over substantially all of the peripheral length of the ring when bent into a circle and successive laminations being progressively shorter, the laminations being laid the one on the other and bent and inserted into an annular head from which they project axially as a translucent ring, the lamp, graticule, screen, and annular head being enclosed in the sighting apparatus but there being an opening at which part of the said annular head is exposed so as to permit of finger-operation of the head.

4. A gun sighting apparatus comprising an illuminating lamp, a graticule in the path of light therefrom, a screen of cylindrical ring-like form surrounding the lamp with the screen located in the path of light rays between said lamp and graticule, the screen varying in translucency around its periphery, and a head carrying said screen, said head comprising a rotatable disc-like body and an annular flange extending outwardly from one face thereof coaxial with said body, said flange having a width equal to substantially one half the width of said screen, and said screen being sprung into engagement with the inner periphery of said annular flange and into engagement with said body so as to expose only substantially one half of the screen in the plane of the light rays between said lamp and graticule, the screen being bodily reversible from end-to-end, to expose the other half of the screen in said plane.

JAMES WEIR FRENCH.